United States Patent [19]

Vander Koy et al.

[11] Patent Number: 6,139,235
[45] Date of Patent: Oct. 31, 2000

[54] VEHICLE LOCK-DOWN ASSEMBLY

[75] Inventors: Tim Vander Koy; Todd Krzanowski, both of Mosinee, Wis.

[73] Assignee: Fulton Performance Products, Inc., Mosinee, Wis.

[21] Appl. No.: 09/277,500

[22] Filed: Mar. 26, 1999

[51] Int. Cl.[7] .............................................. B61D 45/00
[52] U.S. Cl. ............................ 410/111; 410/4; 410/7; 410/101; 410/107; 248/503; 248/551; 224/42.4; 70/234; 70/232; 70/DIG. 57
[58] Field of Search ........................... 70/234, 229, 230, 70/231, 232, 158, 416, 417, DIG. 57; 411/910, 400; 248/551, 503; 410/2, 3, 4, 7, 9, 19, 22, 77, 101, 107, 111; 224/42.4, 401, 569, 42.38

[56] References Cited

U.S. PATENT DOCUMENTS

| | | | |
|---|---|---|---|
| D. 306,252 | 2/1990 | Johnson | D8/331 |
| 337,183 | 3/1886 | Merrill . | |
| D. 339,974 | 10/1993 | Wilcox | D8/343 |
| D. 351,551 | 10/1994 | Wilcox | D8/343 |
| 1,086,670 | 2/1914 | Jory et al. . | |
| 1,380,720 | 6/1921 | Johnson . | |
| 1,492,575 | 5/1924 | Moohan . | |
| 1,711,089 | 4/1929 | Evans . | |
| 1,769,277 | 7/1930 | Snyder et al. . | |
| 1,780,317 | 11/1930 | Snyder . | |
| 2,026,512 | 12/1935 | Tobin | 105/368 |
| 2,128,667 | 8/1938 | Atherton | 105/368 |
| 2,147,014 | 2/1939 | Demarest | 105/368 |
| 2,422,841 | 6/1947 | McClain | 411/400 |
| 2,847,207 | 8/1958 | Chulack et al. | 267/1 |
| 3,245,239 | 4/1966 | Zaidener | 70/302 |
| 3,664,164 | 5/1972 | Zaidener | 70/202 |
| 3,807,593 | 4/1974 | Bourton | 241/505 |
| 3,818,731 | 6/1974 | Waling et al. | 70/232 |
| 3,844,228 | 10/1974 | Blunden et al. | 105/368 T |
| 3,854,424 | 12/1974 | Blunden et al. | 105/368 |
| 3,955,847 | 5/1976 | Schiowitz | 296/65 R |
| 4,469,257 | 9/1984 | Parker | 224/42.45 |
| 4,521,146 | 6/1985 | Wharton | 411/1 |
| 4,580,935 | 4/1986 | Treihaft | 410/3 |
| 4,611,379 | 9/1986 | Heitzman | 29/426.5 |
| 4,710,082 | 12/1987 | Curtis | 411/373 |
| 4,738,127 | 4/1988 | Johnson | 70/209 |
| 4,841,838 | 6/1989 | Scully et al. | 89/36.08 |
| 4,852,779 | 8/1989 | Berg | 224/42.32 |
| 4,856,308 | 8/1989 | Johnson | 70/209 |
| 4,862,716 | 9/1989 | Derman | 70/166 |
| 4,874,284 | 10/1989 | New, Jr. | 414/537 |
| 4,935,047 | 6/1990 | Wu | 70/209 |
| 4,961,331 | 10/1990 | Winner | 70/209 |
| 5,027,627 | 7/1991 | Derman | 70/164 |
| 5,132,551 | 7/1992 | Carlo et al. | 307/10.3 |
| 5,184,023 | 2/1993 | Carlo et al. | 307/10.3 |
| 5,214,945 | 6/1993 | Martin | 70/232 |
| 5,222,381 | 6/1993 | Wilcox | 70/19 |
| 5,228,250 | 7/1993 | Kesselman | 52/98 |
| 5,267,458 | 12/1993 | Heh | 70/238 |
| 5,277,042 | 1/1994 | Tobias | 70/209 |
| 5,278,537 | 1/1994 | Carlo et al. | 340/384.1 |
| 5,287,006 | 2/1994 | Carlo et al. | 307/10.3 |
| 5,361,612 | 11/1994 | Voiculescu et al. | 70/241 |

(List continued on next page.)

*Primary Examiner*—B. Dayoan
*Assistant Examiner*—Clifford B Vaterlaus
*Attorney, Agent, or Firm*—Edgar A. Zarins; Lloyd D. Doigan

[57] ABSTRACT

A lock-down assembly for securing a vehicle to a platform to prevent unauthorized removal such as an all-terrain vehicle to the deck of a trailer. The lock-down assembly includes a retractable bracket secured to the platform and a locking device securing the vehicle to the bracket. The locking device is an extendable bar having U-shaped members at both ends to engage the vehicle and bracket. The retractable bracket includes a base plate fastened to the platform and a selectively extendable U-bolt mounted to the base plate. The U-bolt is fastened to the base plate with a cylindrical bracket which prevents access to the fastening nuts of the U-bolt when the U-bolt is extended for connection to the vehicle. Accordingly, with the vehicle lockingly secured to the bracket, the bracket cannot be removed from the platform.

11 Claims, 2 Drawing Sheets

U.S. PATENT DOCUMENTS

| | | | |
|---|---|---|---|
| 5,365,215 | 11/1994 | Carlo et al. | 340/426 |
| 5,369,970 | 12/1994 | Voiculescu et al. | 70/240 |
| 5,397,925 | 3/1995 | Carlo et al. | 307/10.3 |
| 5,412,963 | 5/1995 | Carlo et al. | 70/209 |
| 5,671,620 | 9/1997 | Carvey et al. | 70/238 |
| 5,699,684 | 12/1997 | Sulin | 70/234 |
| 5,724,839 | 3/1998 | Thering | 70/18 |
| 5,816,757 | 10/1998 | Huston | 410/3 |

VEHICLE LOCK-DOWN ASSEMBLY

BACKGROUND OF THE INVENTION

1. Field of the Invention

This invention relates to an assembly for securing a vehicle to a platform such as the deck of a trailer and, in particular, to a bracket secured to the platform which retracts into the deck when not in use and prevents removal from the deck when lockingly secured to the vehicle.

2. Description of the Prior Art

Trailers are frequently used to tow recreational vehicles such a snowmobiles, all-terrain vehicles and personal watercraft. At a minimum, such vehicles need to be secured or "tied" to the trailer to prevent their movement during towing. Simple devices have been employed for such securement including ropes and chains extending between the vehicle and the frame of the trailer. However, such simple devices tend to be cumbersome because substantial amounts are required to prevent movement on the vehicle. Accordingly, removal of the recreational vehicle becomes time consuming. Additionally, such flexible tie-down devices may loosen over time allowing shifting of the vehicle.

Rigid tie bars have been developed for securing the recreational vehicle to the platform. Typically, one or more rigid bars extend between the vehicle and its trailer to prevent movement. Such devices may include threaded members or clamping devices in order to impart a tie-down force. One end of the rigid member is secured to the vehicle and another end is secured to a portion of the trailer. In some instances, a bracket may be mounted to the platform deck to accept the end of the rigid member. The prior known brackets include a fixed anchor extending above the platform to receive the tie-down member. Such anchors can get in the way when the trailer is used for other applications. Furthermore, securement of the vehicle can be circumvented by removing the bracket from the platform thereby releasing the rigid tie-down and the vehicle.

SUMMARY OF THE PRESENT INVENTION

The present invention overcomes the disadvantages of the prior known vehicle tie-down assemblies by providing a bracket adapted to receive a rigid lock bar which retracts into the platform during non-use and prevents removal of the bracket when connected to the vehicle.

The present invention includes a rigid lock bar which is longitudinally extendable to accommodate a variety of vehicles to be towed on the trailer. The lock bar preferably includes a key-operated locking mechanism which prevents unauthorized removal of the lock bar. One end of the lock bar is designed to be attached to the towed vehicle and another end of the lock bar is attached to a bracket secured to the deck of the trailer.

The tie-down bracket includes a base plate fastened to the platform deck. A U-bolt extends through the base plate and the deck for movement between a retracted position and an extended position for securement to the rigid lock bar. The U-bolt is fastened to the underside of the platform by fastener nuts which prevent removal of the U-bolt from the base plate. A cylindrical bracket is mounted to the U-bolt on the underside of the platform. The bracket receives the arms of the U-bolt. When in the extended position, at least one of the fastener nuts of the U-bolt is housed within the cylindrical bracket preventing access by a removal tool. Accordingly, when the U-bolt is extended for securement to the vehicle, the tie-down bracket cannot be removed from the trailer deck.

Other objects, features and advantages of the invention will be apparent from the following detailed description taken in connection with the following drawing.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which.

DETAILED DESCRIPTION OF A PREFERRED EMBODIMENT OF THE PRESENT INVENTION

Figure 1:
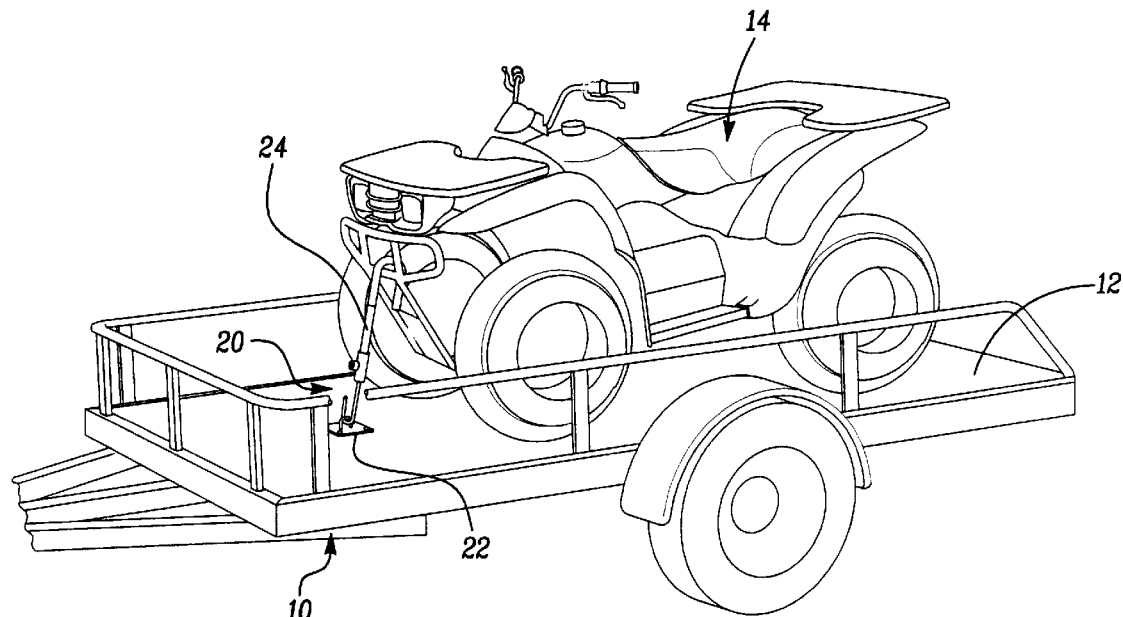
FIG. 1 is a perspective view of a vehicle lockingly secured to a trailer.

Referring first to FIG. 1, there is shown a trailer 10 capable of being towed and including a platform 12 upon which a towed item is positioned. In accordance with the present invention, the trailer 10 is intended to support a vehicle 14 for towing. The vehicle 14 may include personal watercraft, snowmobiles or, as illustrated, all-terrain vehicles. The vehicle 14 may be loaded and unloaded from the platform 12 using a ramp. However, during towing, the vehicle 14 must be secured to withstand the jars and movements of the road. Additionally, it is desirable to lockingly secure the vehicle 14 on the trailer platform 12 to prevent unauthorized removal such as when the trailer 10 is parked.

As best shown in FIGS. 1 through 4, the present invention embodies a lock-down assembly 20 for lockingly securing the vehicle 14 to the platform 12 of the trailer 10. At least one assembly 20 is provided for securing the vehicle 14 although it is contemplated that a lock-down 20 would be provided to secure both the front and rear ends of each vehicle 14 towed on the trailer 10. The assembly 10 generally includes a tie-down bracket 22 secured into the platform 12 and rigid lock bar 24 adapted to be removably connected between the tie-down bracket 22 and the vehicle 14. The lock bar 24 has an adjustable length to accommodate a variety of vehicles 14 as will be subsequently described.

Figure 2:
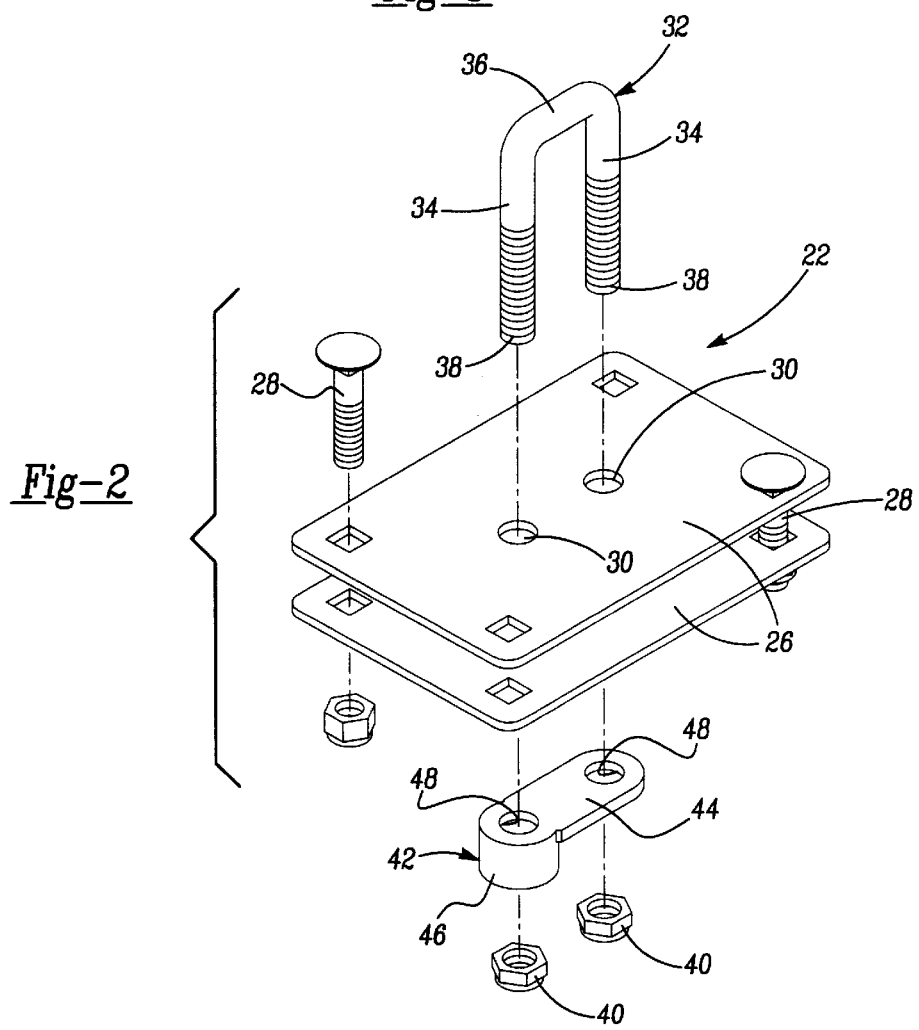
FIG. 2 is an exploded view of the tie-down bracket of the present invention.

The tie-down bracket 22 shown in FIG. 2 is mounted to directly into the platform 12. The bracket 22 includes at least one, and preferably a pair, of base plates 26 fastened to the platform 12 using fasteners 28. In an assembly using a pair of base plates 26, the platform 12 will be sandwiched between the plates 26. The base plates 26 have a pair of apertures 30 configured to receive a U-bolt 32. The U-bolt 32 has a pair of parallel legs 34 which extend through the apertures 30 such that a crossbar 36 of the U-bolt 32 is disposed on top of the base plate 26 and threaded ends 38 the legs 34 are disposed beneath the platform 12. The threaded ends 38 receive nuts 40 to secure the U-bolt 32 within the bracket 22. In addition, a locking member 42 is mounted to the legs 34 prior to threading the nuts 40 thereon.

The locking member 42 is designed to prevent removal of the U-bolt nuts 40 when the U-bolt is attached to the lock bar 24. In a preferred embodiment, the locking member 42 includes a planar body 44 with at least one tubular sleeve 46 extending perpendicular to the planar body 44. A pair of apertures 48 corresponding to the legs 34 of the U-bolt 32 are formed in the body 44 one or both of which are coaxial to the tubular sleeve 46. In the depicted embodiment, the locking member 42 has a single sleeve 46 coaxial with one aperture 48 while the other aperture does not have a tubular sleeve 46. The sleeve 46 is sized to receive the fastening nuts 40 to prevent removal of the nuts 40 to prevent removal of the nuts 40 with the U-bolt in an extended position as will be subsequently described.

Figure 3:
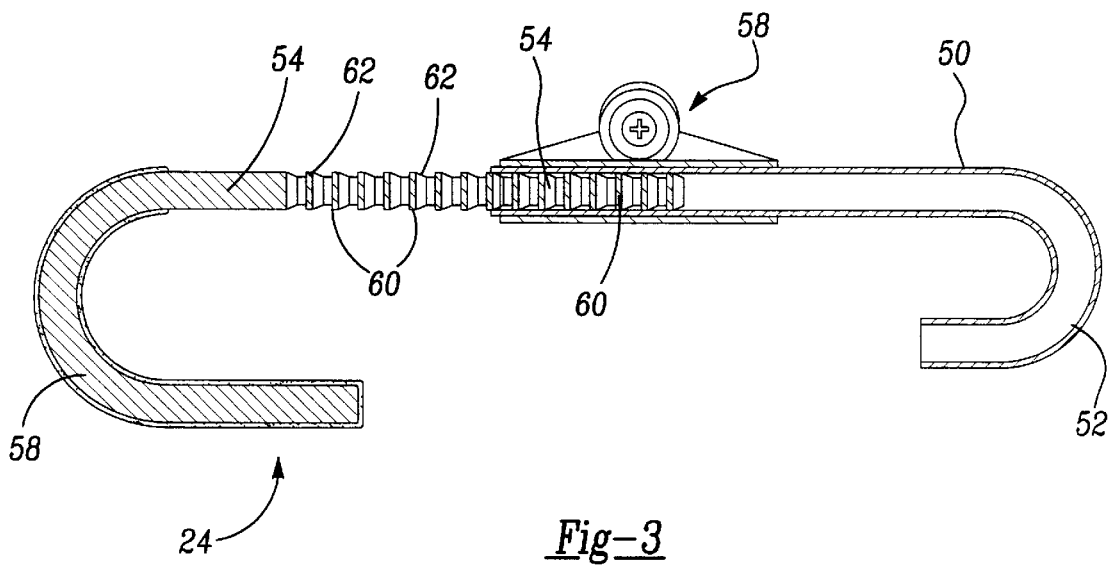
FIG. 3 is a cross-sectional view of the rigid member in an extended position.
Figure 4:
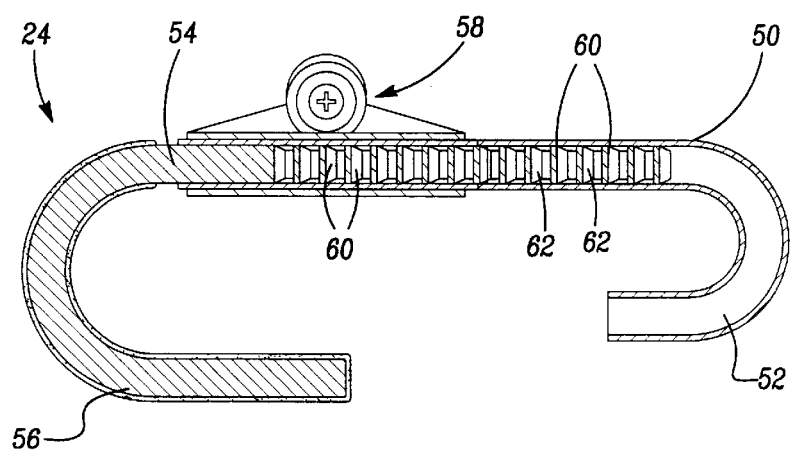
FIG. 4 is a cross-sectional view of the rigid member in a contracted position.

The lock bar 24 is shown in FIGS. 3 and 4 and has a variable length to accommodate different vehicles. The lock bar 24 generally includes a received member 50 with a first hook 52 at an outer end and a male member 54 with a second hook 56 at an outer end thereof. The lock bar 24 is assembled by inserting the male member 54 into the receiver member 50. A lock assembly 58 selectively prevents relative movement of the lock bar 24 components 50,54 maintaining the length of the lock bar 24 until a key is used to disengage the lock assembly 58. In a preferred embodiment, the male member 54 includes a plurality of teeth 60 representing the discrete locking position of the lock bar 24 which sets the length thereof. The teeth 60 have a sloped forward edge 62 to allow the male member 54 to be ratcheted to the desired position relative to the receiver member 50.

A vehicle 14 may be locked to the platform 12 of a trailer 10 using the lock-down 20 of the present invention. Once the vehicle 14 is positioned on the trailer 10, the lock bar 24 is secured between a fixed member of the vehicle 14, such as an axle, roll bar, guard, and the tie-down bracket 22. The first hook 52 is attached to the vehicle 14 and the second hook 56 is attached to the U-bolt 32 of the bracket 22. The lock bar 24 is then compressed to shorten its length until the U-bolt 32 is fully extended and the vehicle 14 is firmly secured. The locking member 42 and nuts 40 will prevent withdrawal of the U-bolt 32 from the base plates 26. With the U-bolt fully extended, at least one of the nuts 40 will be seated within the tubular sleeve 46 and thereby shielded from access by removal tools. With the inability to remove the nuts 40, the bracket 22 will be incapable of being removed while attached to the lock bar 24. Detachment of the lock bar 24 will cause the U-bolt 32 to fall downwardly nearly flush with the platform 12. In this retracted position, the nuts 40 may be removed from the tubular sleeve 46 allowing removal of the bracket 22 if desired. The tie-down bracket 22 may be used with a variety of locking means which maintains the U-bolt 32 in an extended position above the platform surface 12.

The foregoing detailed description has been given for clearness of understanding only and no unnecessary limitations should be understood therefrom as some modifications will be obvious to those skilled in the art without departing from the scope and spirit of the appended claims.

What is claimed is:

1. A tie-down bracket adapted to be mounted to a platform, said tie-down bracket comprising:

a base plate adapted to be mounted to the platform, said base plate having a pair of apertures;

a substantially U-shaped tie-down member extending through said apertures of said base plate, said U-shaped member reciprocally movable between an extended position and a retracted position; and a locking member mounted to said U-shaped tie-down member beneath said base plate, said locking member secured to said U-shaped member by fastener means, said locking member including a planar body and a tubular sleeve formed perpendicular to said planar body, a first leg of said tie-down member extending through said tubular sleeve and a second leg of said tie-down member extending through said planar body of said locking member, said fastener means being selectively concealed within said tubular sleeve of said locking member preventing access to said fastener means when said U-shaped tie-down member is in said extended position, said fastener means accessible exteriorly of said locking member upon movement of said U-shaped tie-down member to said retracted position for release of said tie-down bracket.

2. The bracket as defined in claim 1 wherein said first and second legs of said U-shaped member are threaded and extend through said base plate, said fastener means including fastener nuts threadably attached to said U-shaped member.

3. The bracket as defined in claim 2 wherein said U-shaped tie-down member has a cross-member extending between said threaded legs, said cross member disposed above said base plate upon insertion of said U-shaped member through said base plate, said cross-member spaced apart from said base plate when said U-shaped member is in said extended position and said cross-member proximate said base plate when said U-shaped member is in said retracted position.

4. A tie-down bracket adapted to be mounted to a platform, said tie-down bracket comprising:

at least one base plate adapted to be fastened to the platform, said at least one base plate having a pair of apertures;

a substantially U-shaped tie-down member reciprocally disposed within said apertures, said U-shaped tie-down member having a pair of threaded legs extending through said apertures and a cross-member between said legs, said U-shaped member reciprocally movable between an extended position with said cross-member spaced above said at least one base plate and a retracted position with said cross-member proximate said at least one base plate; and a locking member mounted to said legs of said U-shaped tie-down member beneath said at least one base plate, said locking member secured to said U-shaped member by fastener means, said locking member including a planar body and a tubular sleeve formed perpendicular to said planar body, a first leg of said tie-down member extending through said tubular sleeve and a second leg of said tie-down member extending through said planar body of said locking member, said fastener means being selectively concealed within said tubular sleeve of said locking member preventing access to said fastener means when said U-shaped tie-down member is in said extended position.

5. The bracket as defined in claim 4 wherein said fastener means includes fastener nuts threadably attached to said threaded legs, one of said fastener nuts concealed within said tubular sleeve upon extension of said U-shaped tie-down member.

6. A lock-down assembly for selectively securing a vehicle to a platform, said lock-down assembly comprising:

a tie-down bracket adapted to be secured to said platform, said tie-down bracket including a substantially U-shaped member adapted to extend through the platform, said U-shaped member reciprocally movable between an extended position and a retracted position and a locking member mounted to said U-shaped tie-down member beneath the platform, said locking member secured to said U-shaped member by fastener means, said locking member including a planar body and a tubular sleeve formed perpendicular to said planar body, a first leg of said tie-down member extending through said tubular sleeve and a second leg of said tie-down member extending through said planar body, said fastener means being selectively concealed within said tubular sleeve preventing access to said fastener means when said U-shaped tie-down member is in said extended position; and a lock bar adapted to be selectively deployed between the vehicle and said tie-down bracket, said lock bar having an adjustable length to engage the vehicle and move said U-shaped tie-down member to said extended position.

7. The lock-down assembly as defined in claim 6 wherein said lock bar includes a first end detachably mountable to the vehicle and a second end detachably engageable with said U-shaped tie-down member of said bracket.

8. The lock-down assembly as defined in claim 7 wherein said lock bar includes lock means for controlling adjustment of the length of said lock bar.

9. The lock-down assembly as defined in claim 6 wherein said tie-down bracket includes at least one base plate adapted to be fastened to the platform, said U-shaped tie-down member extending through said at least one base plate.

10. The bracket as defined in claim 7 wherein a first leg of said tie-down member extends through said tubular sleeve of said locking member, said fastener means being selectively concealed within said tubular sleeve to prevent access thereto upon movement of said U-shaped tie-down member to said extended position.

11. The bracket as defined in claim 10 wherein said fastener means includes fastener nuts threadably attached to said threaded legs, one of said fastener nuts concealed within said tubular sleeve upon extension of said U-shaped tie-down member.

* * * * *